United States Patent
Cooper et al.

(10) Patent No.: US 7,231,083 B1
(45) Date of Patent: Jun. 12, 2007

(54) CONTROLLING PROCESSOR-BASED SYSTEMS USING A DIGITAL CAMERA

(75) Inventors: Frederick J. Cooper, Portland, OR (US); Ranjit R. Menon, Beaverton, OR (US); Teresa L. Urutia, Forest Grove, OR (US); Girish Gopal, Hillsboro, OR (US); Keith E. Hopper, Aloha, OR (US); Blake R. Bender, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 900 days.

(21) Appl. No.: 09/430,282

(22) Filed: Oct. 29, 1999

(51) Int. Cl.
*G06K 9/00* (2006.01)

(52) U.S. Cl. .................. 382/162; 382/165; 382/107

(58) Field of Classification Search ............ 382/162, 382/165, 107, 286, 103; 345/867; 348/14.1, 348/154, 155; 700/17; 713/320
See application file for complete search history.

(56) References Cited

U.S. PATENT DOCUMENTS

| | | | | |
|---|---|---|---|---|
| 5,675,810 A | | 10/1997 | Sellers ..................... 395/750 |
| 5,986,695 A | * | 11/1999 | Choi ......................... 348/143 |
| 6,002,427 A | * | 12/1999 | Kipust ....................... 340/571 |
| 6,108,028 A | * | 8/2000 | Skarbo et al. ............. 345/753 |
| 6,130,707 A | * | 10/2000 | Koller et al. .............. 340/511 |
| 6,308,272 B1 | * | 10/2001 | Pearce .................... 340/568.2 |
| 6,374,145 B1 | * | 4/2002 | Lignoul .................... 345/867 |
| 6,384,852 B1 | * | 5/2002 | Ye et al. ................... 340/995 |
| 6,400,830 B1 | * | 6/2002 | Christian et al. .......... 348/155 |

* cited by examiner

*Primary Examiner*—Phuoc Tran
(74) *Attorney, Agent, or Firm*—Trop, Pruner & Hu, P.C.

(57) ABSTRACT

A processor-based system may be controlled using a digital camera. The digital camera can provide luminance and motion information which may be analyzed to determine whether to alter one or more of the power consumption state, the operation of system utilities, or the operation of a screen saver.

6 Claims, 5 Drawing Sheets

CONTROLLING PROCESSOR-BASED SYSTEMS USING A DIGITAL CAMERA

BACKGROUND

This invention relates generally to processor-based systems and particularly to such systems which have a digital camera coupled to the system.

A variety of processor-based systems come with a digital camera or are adaptable to be coupled to a digital camera. Commonly, digital cameras are tethered through an appropriate input port to personal computers. A number of users operate the digital cameras continuously through a tethered connection to the computer.

The camera may be maintained always "on", ready to provide a useful service as the opportunity arises. The camera may be used to implement a video conferencing feature or to stream video over the Internet as examples.

A number of techniques are available for controlling processor-based systems. Processor-based systems may receive input commands using a mouse which is tethered to the computer, using an infrared mouse which controls the computer remotely, using a variety of remote control devices, and using keyboards either tethered to the computer or keyboards that are coupled to the computer through infrared or other airwave communications, as a few examples.

In addition, a number of computer systems transition between power consumption states in response to periods of sustained user inactivity. That is, if the keyboard, for example, is not operated for a given time period, the system may transition to a lower power consumption state. With ensuing periods of inactivity, the system may progressively transition to even lower power consumption states. In this way, the amount of power that the system consumes may be controlled. In addition to environmental advantages, the lifetime of the computer may be enhanced by such powering down in response to inactivity.

Sensors may detect the user's presence in proximity to the keyboard. These sensors may be piezoelectric sensors that detect when the user is poised over the keyboard, for example. Again, this type of sensor provides additional information to the computer system to make a judgment about whether or not to transition to lower power consumption modes. If the user is poised over the keyboard about to operate the keyboard, it makes no sense to transition to a lower power consumption mode only to immediately transition back to a higher power consumption mode. Not only is this awkward, but needless transitions waste time and system resources.

Thus, there is a continuing need for better ways to control the power consumption of computer systems.

SUMMARY

In accordance with one aspect, a method of controlling a processor-based system includes receiving video information from a camera. The power consumption state of the system is controlled based on the video information.

Other aspects are set forth in the accompanying detailed description and claims.

DETAILED DESCRIPTION

Figure 1:
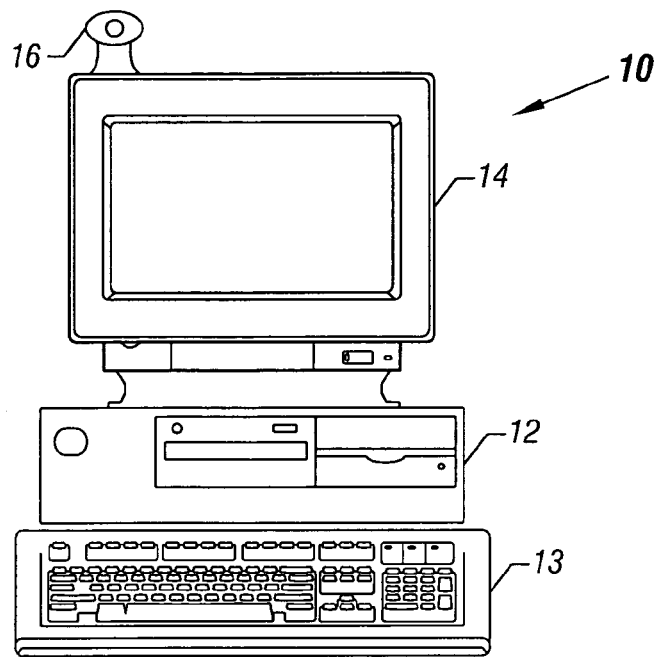
FIG. 1 is a front elevational view of a processor-based system in accordance with one embodiment of the present invention.

A processor-based system 10 shown in FIG. 1, includes a processor-based housing 12, a keyboard 13, a display 14 and a digital camera 16 which may be coupled by a tether (not shown) to the housing 12. As illustrated, the camera 16 is positioned to observe the area in front of the processor-based system 10. Thus, the camera 16 detects the user's presence as well as the lighting conditions proximate to the system 10.

Figure 2:
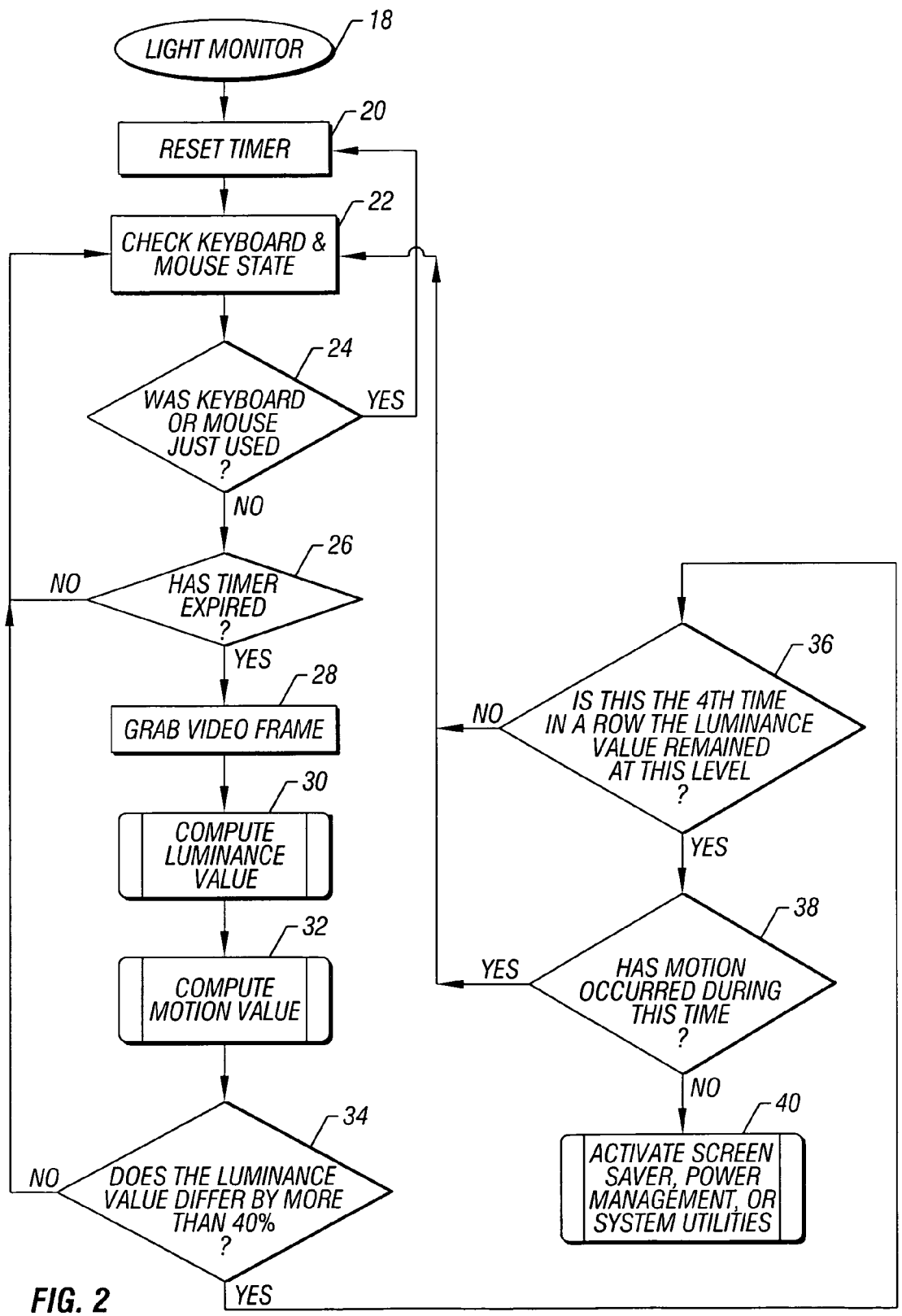
FIG. 2 is a flow chart for software for implementing one aspect of one embodiment of the present invention.

Referring now to FIG. 2, light monitoring software 18 stored on the system 10, is responsible for controlling the power consumption state of the processor-based system 10 in response to ambient light. A timer is reset (block 20) and the keyboard and mouse are checked for their current condition (block 22). At diamond 24, a check determines whether the keyboard and mouse have just been used. If so, the timer is again reset. If not, the check at diamond 26 determines whether the timer has expired. If the timer has expired, indicating a period of inactivity exceeding a predetermined time period, a video frame is grabbed as indicated in block 28. In other words, the camera 16 provides a video frame which may be analyzed at block 30. In particular, the luminance value of the frame may be computed at block 30.

A subsampling of the pixels of a frame may be analyzed, for example, approximately 250 pixels in one embodiment of the invention, evenly distributed throughout the frame. Each pixel's luminance value is computed by converting its red, green, blue (RGB) color space value to a hue, saturation and luminance (HSL) color space value using well known techniques. Luminance is the brightness portion of a composite video signal. The pixel luminance values are simply summed and divided by the number of samples. The result is the return luminance value.

Figure 3:
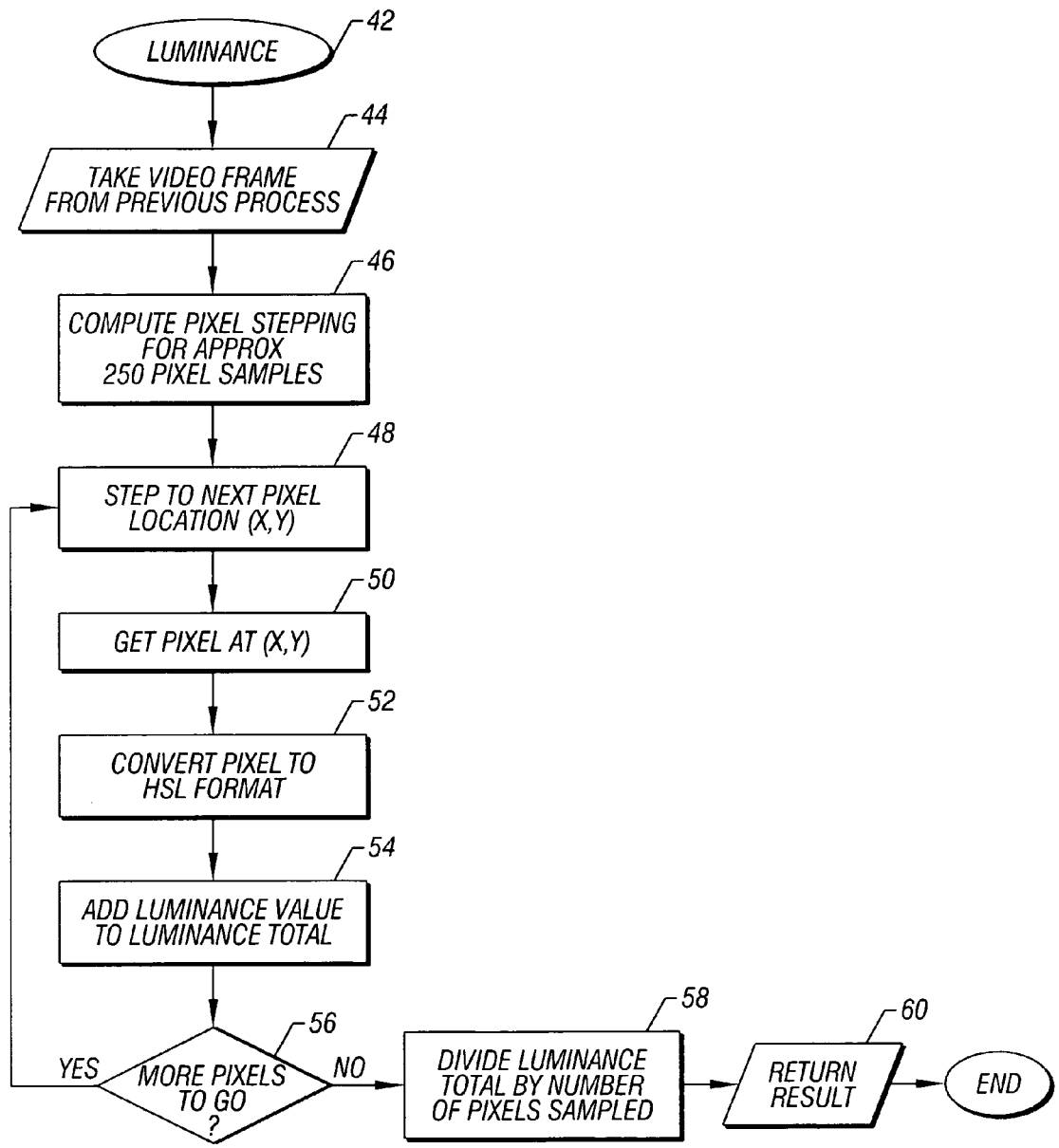
FIG. 3 is a flow chart for software for implementing another aspect of one embodiment of the present invention.

Referring to FIG. 3, the software 42 for determining the return luminance value begins by taking the video frame as described previously (see block 44). The pixel stepping for the pre-set sample set, approximately 250 pixel samples in this example, is computed (block 46). The software steps to the next pixel location (block 48). The pixel at the next location has its RGB color space values converted to an HSL format (blocks 50 and 52). The luminance value of the next pixel (from the HSL space) is added to the accumulated luminance total value, as indicated in block 54. If there are more pixels to complete the sample set, the flow iterates. If not, the luminance total is divided by the number of pixel samples as indicated in block 58. The result is then returned to the flow in FIG. 2, as indicated at block 60.

Figure 4:
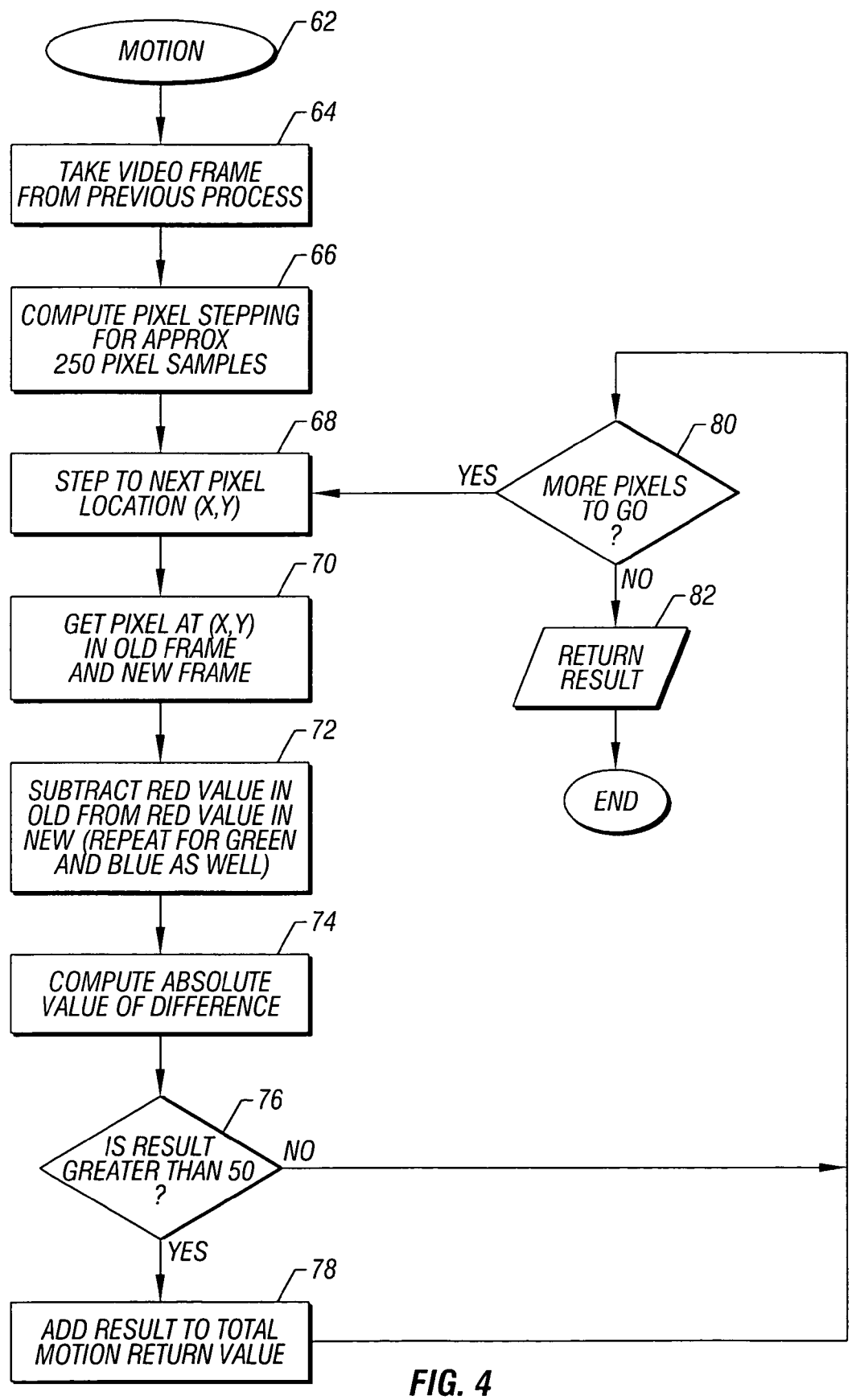
FIG. 4 is a flow chart for software for implementing another aspect of one embodiment of the present invention.

Returning to FIG. 2, next the motion value is computed (block 32). As shown in FIG. 4, software 62 for computing the return motion value begins by taking the video frames from the previous steps (FIG. 2) as indicated at block 64. The pixel stepping for a pre-set number of pixels, for example approximately 250 pixels, is computed, as indicated in block 66. The flow steps through each successive pixel as indicated in block 68. At block 70, the pixel at the new location in the old frame and new frame are accessed. The red value in the old frame is subtracted from the red value in the new frame and this process is repeated for the blue and green values as indicated in block 72. An absolute value of the difference is computed (block 74).

If the result is greater than 50 or some other noise threshold (diamond 76), the result is added to the total motion return value (block 78). At diamond 80 a determination is made as to whether there are additional pixels in the initial set of 250 pixel samples. If not, the motion value is returned (block 82). Otherwise, the flow continues to iterate until all the pixels in the sample have been processed.

Returning again to FIG. 2, at diamond 34 the flow determines whether the returned luminance value differs by more than 40 percent. Of course, 40 percent is merely an exemplary threshold for testing the returned luminance value. If so, a check at diamond 36 determines whether this is the fourth time (or some other number) in a row that the luminance value remained at this level. If so, a check at diamond 38 determines whether motion has occurred during the time period. If not, appropriate changes can be made as indicated in block 40. Among the changes that may be made are to activate a screen saver, implement a power management decision or implement a system utility.

Once the camera 16 is activated, it may capture a frame every second in one embodiment of the invention. The system 10 computes the luminance value for each frame and compares its value to the luminance value computed for a previous frame. If the number is significantly lower than that of previous frames, the software starts to suspect the lights might be out. It keeps capturing frames, computing both a luminance value and a motion value. If the luminance value continues to be low for several frames and the motion value is also low, the computer screen saver and power management mode may be activated. When full power management is turned on, a keyboard or mouse input signal may be used to reactivate the computer. However, the camera 16 can continue to run with the monitors, printers and hard drives powered down, as long as the processor remains on.

The camera continues to capture frames while the computer is in the lower power usage mode or screen saver mode. It compares the frames and computes the luminance value for each frame. If the luminance suddenly increases, the system is immediately returned to full power status and/or the screen saver is deactivated. If the luminance values do not change significantly, and motion occurs for a time period (for example continuously for three seconds), the system may be returned to full power status and/or the screen saver may be deactivated.

Figure 5:
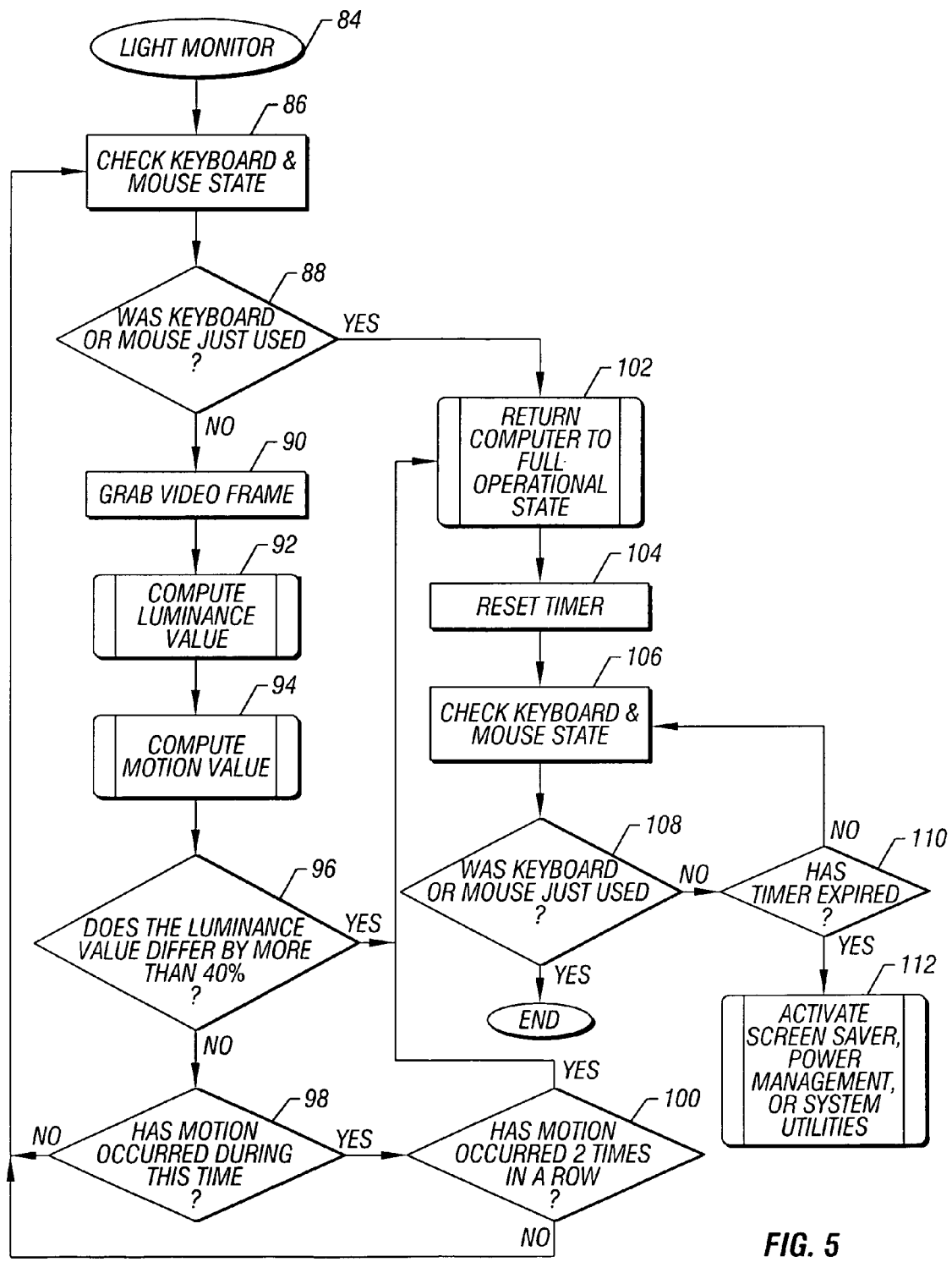
FIG. 5 is a flow chart for software that implements another aspect of one embodiment of the present invention.

Turning now to FIG. 5, the software 84 for leaving the screen saver, power management, or system utility modes begins by checking the keyboard and mouse status (block 86). At diamond 88, a check determines whether the keyboard or mouse was just used. If so, the computer is returned to full operational status as indicated in block 102. The timer is reset, as indicated in block 104, and the keyboard and mouse states are checked (block 106).

At diamond 108, a check determines whether the keyboard or mouse were just used. If not, the flow determines (at diamond 110) whether the timer has expired. If so, the screen saver, power management mode or system utilities may be reactivated, as indicated in block 112. Otherwise, the system continues to check the keyboard and mouse state, as indicated in block 106.

If the keyboard and mouse were not used as determined at diamond 88, a video frame is grabbed as shown in block 90. A luminance value and motion value are computed as indicated in blocks 92 and 94. If the luminance value does not differ by a preset amount (for example more than 40% at diamond 96), a check at diamond 98 determines whether motion has occurred. If so, a check at diamond 100 determines whether motion has occurred two times in a row. If so, the system returns to full activation (block 102). If not, the flow returns to block 86 and checks keyboard and mouse states.

Figure 6:
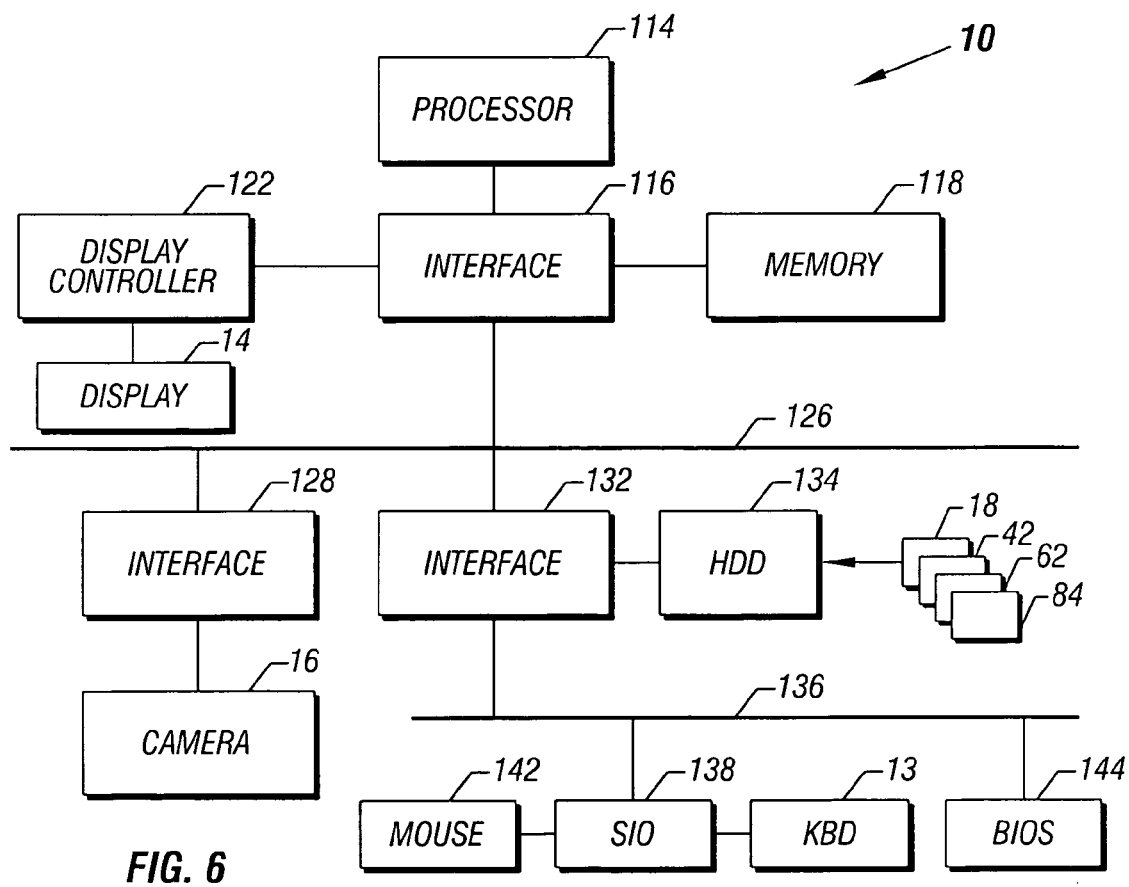
FIG. 6 is a block diagram for the embodiment shown in FIG. 1.

Referring now to FIG. 6, the system 10 may include a processor 114 coupled to an interface 116. The interface 116 may be a chipset or bridge, as two examples. The interface 116 may be coupled system memory 118 and a display controller 122. The display controller is coupled to the display 14.

The interface 116 may also couple a bus 126. The bus 126 in turn may be coupled through an interface 128 to the camera 16. In addition, the bus 126 may couple an interface 132. The interface 132 may be coupled to a bus 136 and to a storage device such as a hard disk drive 134. The software 18, 42, 62 and 84 may be stored on the hard disk drive 134.

The bus 136 is coupled to conventional components such as a serial input/output device 138. The device 138 couples a mouse 142 and a keyboard 13. The basic input/output system (BIOS) 144 may also be provided on the bus 136.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method of controlling a processor-based system comprising:
   receiving video information;
   analyzing said information to develop information about the luminance level of said video information; and
   controlling the power consumption state of said system based at least in part on said luminance information.

2. The method of claim 1 further including controlling the operation of a screen saver based on said luminance information.

3. The method of claim 1 further including controlling the operation of system utilities based on said luminance information.

4. The method of claim 1 including determining whether the video information indicates motion.

5. An article comprising a medium for storing instructions that enable a processor-based system to:
   analyze video information to develop luminance information; and
   control the power consumption state of said system based at least in part on said luminance information.

6. The article of claim 5 further storing instructions that cause a processor-based system to determine whether the video information indicates motion.

* * * * *